United States Patent [19]

Sato et al.

[11] 4,296,972

[45] Oct. 27, 1981

[54] ANTI-SKID BRAKE CONTROL DEVICE

[75] Inventors: Makoto Sato, Kamifukuoka; Hiroshi Takamatsu, Ohimachi; Yoshitaka Miyagawa, Kawagoe; Etsuo Fujii, Wako, all of Japan

[73] Assignee: Honda Giken Kogyo Kabushiki Kaisha, Tokyo, Japan

[21] Appl. No.: 50,204

[22] Filed: Jun. 20, 1979

Related U.S. Application Data

[60] Continuation of Ser. No. 871,186, Jan. 20, 1978, which is a division of Ser. No. 762,782, Jan. 25, 1977, Pat. No. 4,129,342.

[30] Foreign Application Priority Data

| Jan. 29, 1976 [JP] | Japan | 51/8682 |
| Feb. 2, 1976 [JP] | Japan | 51/10195 |
| Feb. 16, 1976 [JP] | Japan | 51/15607 |

[51] Int. Cl.³ .................. B60T 8/08; B60T 13/68
[52] U.S. Cl. .................... 303/119; 303/96; 303/113
[58] Field of Search ......... 188/181; 303/113–119, 303/96, 106, 111, 105

[56] References Cited

U.S. PATENT DOCUMENTS

| 2,868,338 | 1/1959 | Lucien et al. | 303/113 X |
| 3,639,009 | 2/1972 | Klein et al. | 303/105 X |
| 4,129,342 | 12/1978 | Sato et al. | 303/113 X |

*Primary Examiner*—Harry E. Moose, Jr.
*Assistant Examiner*—Reinhard J. Eisenzopf
*Attorney, Agent, or Firm*—Haseltine and Lake

[57] ABSTRACT

An anti-skid brake control device including a wheel cylinder having defined therein a first hydraulic chamber connected with a brake fluid line extending from the master cylinder and a second hydraulic chamber connected with a pressure controlling fluid circuit. As the brake fluid line is isolated from the pressure controlling circuit by the output member of the wheel cylinder, the brake system can operate effectively, though in a conventional manner, should oil leakage occur in the controlling circuit. On a four-wheeled vehicle, each pair of front or rear wheel cylinders can be served by a common arrangement of such pressure controlling circuit for anti-skid control.

1 Claim, 2 Drawing Figures

ANTI-SKID BRAKE CONTROL DEVICE

The present application is a Rule 60 Continuation application of U.S. Ser. No. 871,186 filed Jan. 20, 1978, which is a Divisional application of parent application U.S. Ser. No. 762,782 filed Jan. 25, 1977 which has matured into U.S. Pat. No. 4,129,342 issued on Dec. 12, 1978.

BACKGROUND OF THE INVENTION

This invention relates generally to brake systems for use with wheeled vehicles and more particularly to anti-skid brake control devices unable therein which are designed to automatically reduce the braking torque as exerted on the wheels when the danger of wheel locking is imminent so that the vehicle can be braked efficiently at all times without causing any skidding of the wheels.

Previously known forms of anti-skid brake control device are generally designed so that the brake fluid lines interconnecting the pressure output chamber of the brake fluid pressure producing unit, which is actuated by a brake pedal, and the hydraulic pressure receiving chambers of the brake assemblies, mounted at the respective vehicle wheels, are momentarily closed to reduce the pressure in these chambers when the danger of wheel locking is imminent.

With such anti-skid brake control device, however, there is the danger that the hydraulic pressure in the brake fluid lines could fail and render the brake system ineffective should oil leakage occur in the controlling fluid circuit of the device, which is arranged in connection with the brake fluid lines.

SUMMARY OF THE INVENTION

The present invention is intended to overcome the difficulties previously encountered as described above and has for its object the provision of a new and improved anti-skid brake control device for use with wheeled vehicles which is designed to minimize the danger of brake failure as resulting from leakage of hydraulic fluid.

Another object of the present invention is to provide an anti-skid brake control device of the character described which is simplified in structure and inexpensive.

The above and other objects and advantages of the present invention will become apparent from the following detailed description when taken in conjunction with the accompanying drawings.

Figure 1:
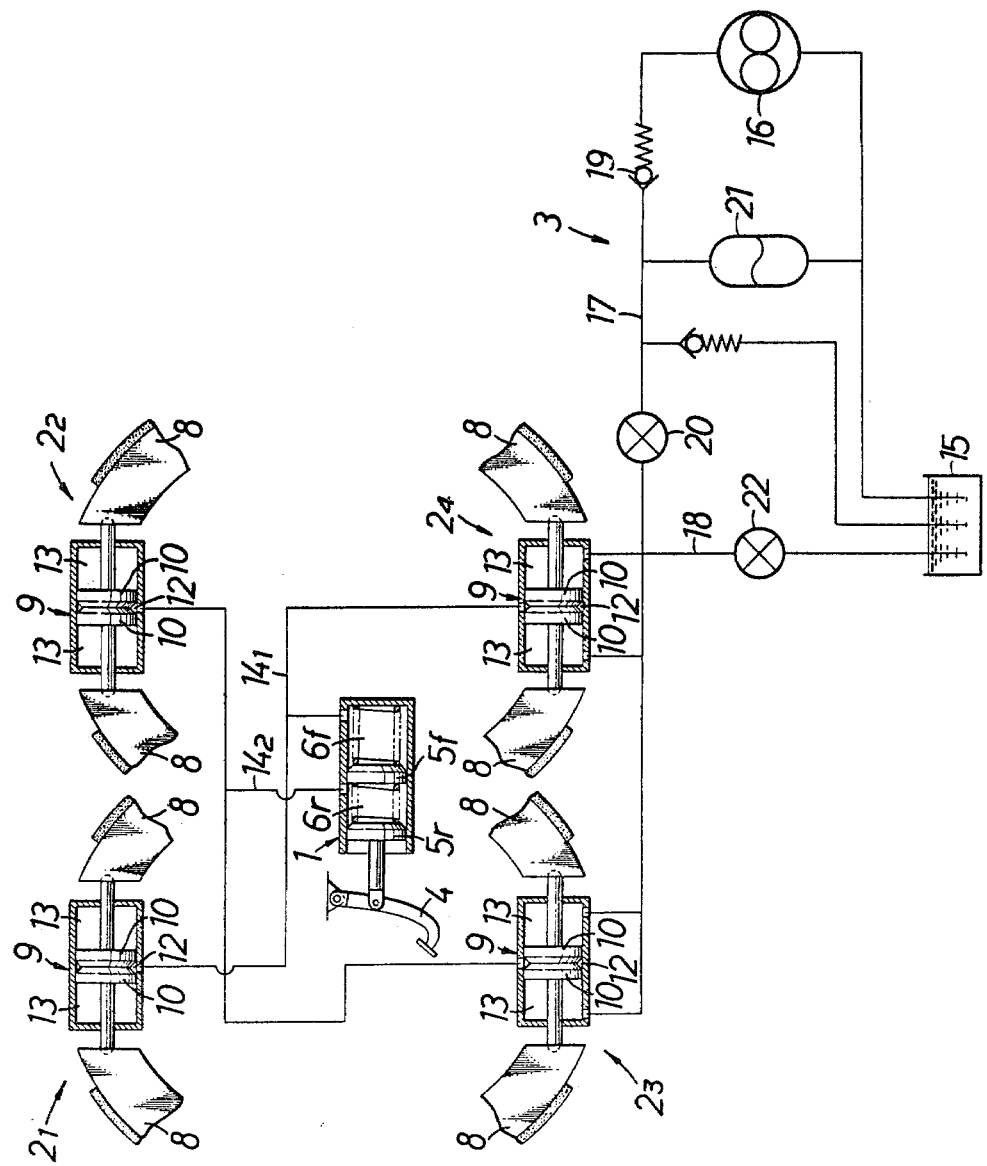
FIG. 1 illustrates the whole system of the present invention.

The brake mechanism 2, of the oil hydraulic form, is comprised of a brake drum fixed to the wheel for rotation therewith, a pair of brake shoes 8—8 floatingly or rockably supported inside of the brake drum on a fixed panel, not shown, and a wheel cylinder 9 interposed between the movable end portions of the respective brake shoes 8—8. Slidably fitted in the wheel cylinder 9 are a pair of opposed output pistons which are formed integral with respective piston rods 10a—10a connected with the movable end portions of the brake shoes 8—8.

In this manner, there is provided a first hydraulic chamber 12 between the two output pistons 10 with a pair of second hydraulic chambers 13—13 defined between each of the output pistons 10—10 and the adjacent one of end wall members 11—11 secured to the wheel cylinder 9 at its opposite open ends. As shown, the first hydraulic chamber 12 is in fluid communication with the pressure output chamber 6 of the brake master cylinder 1 by way of a brake fluid line 14.

As shown, the control system 3 includes an oil reservoir 15, an oil pressure source pump 16 having a suction port opening into the oil reservoir 15, a high-pressure oil line 17 extending from the delivery port of oil pump 16, and a low-pressure oil line 18 opening at one end into the oil reservoir 15. Both the high-pressure and low-pressure oil lines 17 and 18 are connected at the other end to the pair of second hydraulic chambers 13—13. Inserted in the high-pressure oil line 17 are a non-return valve 19 and a first control valve in the form of a normally-closed solenoid valve 20, which is arranged on the downstream side of non-return valve 19, with an accumulator 21 connected with the oil line 17 between the valves 19 and 20. Inserted in the low-pressure oil line 18 is a second solenoid valve 22, which is a normally-open control valve.

Incidentally, there is no assurance that, when the vehicle comes to stop under operation of the control system 3, the second sensor switches 31L and 31R be closed and the keep relay 25 reset. If the vehicle comes to stop with the keep relay 25 held in its set state or with the relay contact 26 held closed, the second hydraulic chambers 13—13 of the wheel cylinder 9 must remain in the high pressure state, involving the danger of causing trouble in the next cycle of braking operation.

In view of this, there is provided in the command system 23 of the brake control device an off-delay timer 32 which is actuated by the signal output from the first sensor switch 30 and has a contact 33 connected with the reset coil 28 of keep relay 25 in parallel with the second sensor switch 31. The timer contact 33 is arranged so as to open when reset and be held in set or closed position only during a period of time elapsing after the closing of the first sensor switch 30 till a predetermined length of time after the re-opening of the sensor switch 30.

With this arrangement, even if the second sensor switch 31 remains open, the keep relay 25 is reset without fail under the action of the off-delay timer 32 if only the first sensor switch 30 opens and when the predetermined length of time has elapsed after the switch opening and thus, the danger referred to above of causing trouble to the next cycle of braking operation is effectively eliminated. As will be readily noted, however, the time delay in the opening of timer contact 33, elapsing after the first sensor siwtches 30L and 30R have opened, should be so determined as to be longer than the length of time elapsed between the opening of first sensor switches 30L and 30R and the closing of second sensor switches 31L and 31R are usually 0.05 second or less, in order not to incur any trouble in the normal anti-skid control operation.

Reference will be had to FIG. 1, which illustrates one application of the present invention to a four-wheeled automobile equipped with a dual-line brake system.

In this illustration, the brake master cylinder 1 is of a well-known tandem structure including a rear hydraulic piston 5r, connected with a brake pedal 4, and a floating, front hydraulic piston 5f, a pair of front and rear hydraulic power chambers 6f and 6r defined in the cylinder by the hydraulic pistons 5f and 5r. Reference numerals $2_1$ and $2_2$ indicate a first and a second brake mechanism respectively associated with the left and right front wheels of the vehicle and numerals $2_3$ and $2_4$, a third and a fourth brake mechanism respectively associated with the left and right rear wheels. These brake mechanisms are the same in structure as the brake mechanism 2 shown in FIG. 1 and are shwon with the same references retained for equivalent members. The brake mechanisms are connected with the brake master cylinder 1 by a so-called X type pipe arrangement, which includes a first and a second brake fluid line $14_1$ and $14_2$. The first fluid line $14_1$, extending from the front hydraulic chamber 6f of brake master cylinder 1, is connected to the first hydraulic chambers 12 of the first and fourth brake mechanism $2_1$ and $2_4$ while the second fluid line $14_2$, extending from the rear hydraulic chamber 6r of brake master cylinder 1, is connected with the first hydraulic chambers 12 of the second and third brake mechanisms $2_2$ and $2_3$.

In this connection, it is to be noted that, in practicing the present invention, the fluid line arrangement may take any form other than the X arrangement and, for example, the first fluid line $14_1$ may be connected with the first and third brake mechanisms $2_1$ and $2_3$ with the second fluid line $14_2$, in this case, connected with the second and fourth brake mechanisms $2_2$ and $2_4$.

As observed, the control system 3 of FIG. 1 illustrates a high-pressure and a low-pressure fluid line 17 and 18 both connected with the pairs of second hydraulic chambers 13—13 of third and fourth brake mechanisms $2_3$ and $2_4$.

Figure 2:
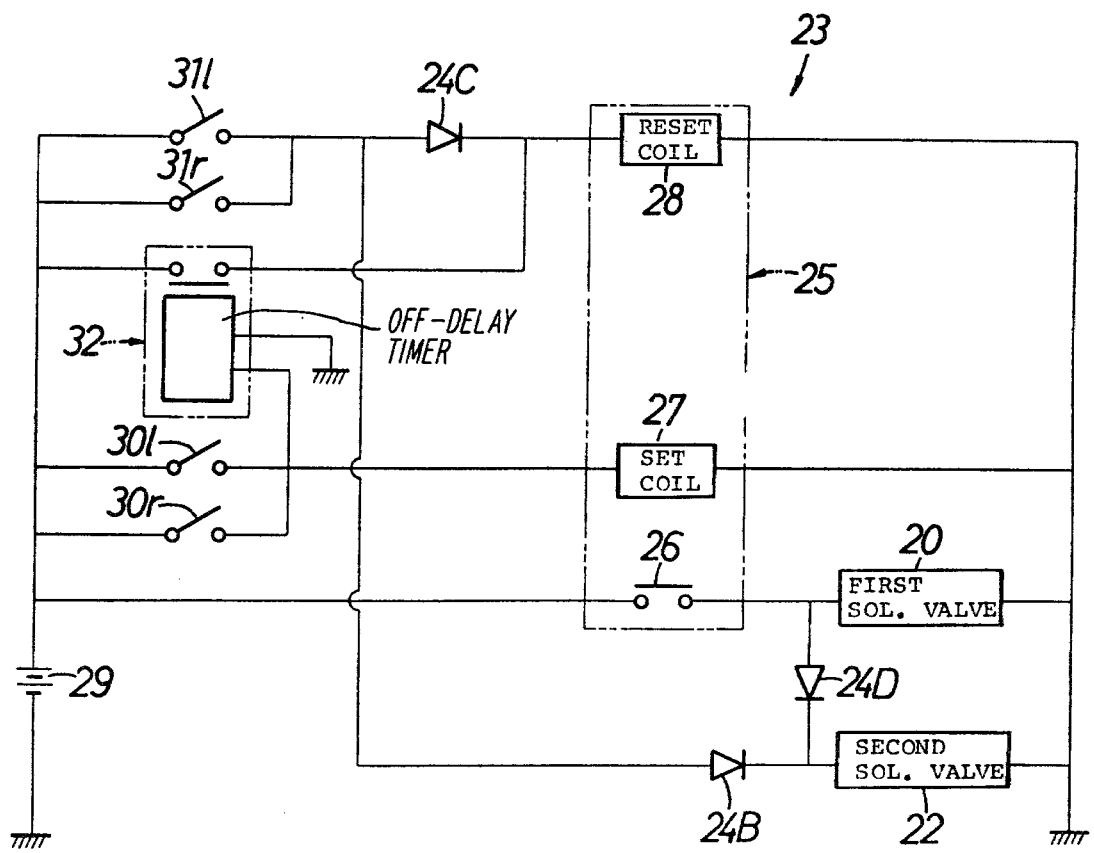
FIG. 2 is an electric circuit diagram illustrating a form of electric command system employed in a brake control device.

First and second solenoid valves 20 and 22 are operable under the control of an appropriate electric command system, one example of which is illustrated in the electric circuit diagram of FIG. 2.

Referring to FIG. 2, the two solenoid valves 20 and 22 have their solenoid coils connected in parallel with each other and both connected to a battery 29 through the contact 26 of a keep relay 25. The keep relay 25 includes a set coil 27 which is connected with the battery 29 through the medium of a pair of parallel-connected first sensor switches 30L, 30R and, when energized, operates to hold the contact 26 in closed position. The keep relay 25 also includes a reset coil 28, which is connected to the battery 29 by way of a diode 24C and a pair of parallel-connected second sensor switches 31L, 31R and, when energized, acts to reset the relay contact 26 in its open position. The solenoid coils of the valves 20 and 22 are also connected through a diode 24B to the reset line between the second sensor switches 31L, 31R and diode 24C. It is to be noted that the first sensor switches 30L and 30R close when they sense any angular deceleration exceeding a predetermined threshold value a of the left and right rear vehicle wheels as braked by the brake mechanism 2 while the second sensor switches 31L and 31R close when they sense any angular acceleration exceeding a predetermined threshold value b of the left and right rear vehicle wheels. Both the two sensor switches may take any known form of inertial force sensing switch and their structure will not be described here in any detail.

To summarize, in this embodiment of the present invention, the hydraulic brake mechanism associated with each of the vehicle wheels is provided with a first hydraulic chamber defined on one side of the operating member such as an output piston and placed in fluid communication with a hydraulic pressure producing unit such as a brake master cylinder and a second hydraulic chamber defined on the other side of the operating member. In the braking operation, the second hydraulic chamber is fed with a fluid pressure effective to counteract the one acting in the first hydraulic chamber in order to reduce the braking torque when the danger of wheel locking is imminent, whereby the vehicle can be braked with good efficiency without causing any wheel skidding. Moreover, even if oil leakage occurs in the oil control circuit connected with the second hydraulic chamber, there is no danger of the brake oil leaking out of the brake fluid circuit including the brake master cylinder since the brake fluid circuit is isolated from the oil control circuit by the operating member of the brake mechanism. This enables the anti-skid brake system to operate effectively, though in a conventional manner, despite such oil leakage in the oil control circuit, thus giving a particularly high reliability to the system.

Though a few preferred embodiments of the present invention have been shown and described, it will be apparent to those skilled in the art that various changes and modifications may be made therein without departing from the spirit of the invention or from the scope of the appended claims.

What is claimed is:

1. An anti-skid brake control system for use with four wheeled vehicles, comprising: a brake fluid pressure producing unit, said unit having a pair of two independent power chambers defined therein; a pair of first front and rear wheel cylinders each having a piston slidable therein with a brake applying element connected thereto and a first hydraulic chamber formed therein on one side of said piston, said first hydraulic chamber being connected to one of said power chambers for applying hydraulic pressure to said piston for brake application; said rear wheel cylinder having a second hydraulic chamber formed therein, on the opposite side of said piston and being hydraulically connected to high and low pressure lines for applying a regulated hydraulic pressure to said piston for counteracting hydraulic pressure applied thereto; a pair of second front and rear wheel cylinders, each having a corresponding piston slidable therein with a brake applying element connected thereto and a third hydraulic chamber formed therein on one side of said last-named piston, said third hydraulic chamber being connected to the other of said power chambers for applying hydraulic pressure to said last-named piston for brake application; said second rear wheel cylinder having a fourth hydraulic chamber formed therein on the opposite side of said last-named piston and being hydraulically connected to said high and low pressure lines for applying a regulated hydraulic pressure to said last-named piston for counteracting hydraulic pressure applied thereto; a first control valve interposed in said high pressure line for selectively establishing and blocking hydraulic communication between said second and fourth hydraulic chambers and a hydraulic pressure source; a second control valve interposed in said low pressure line for selectively establishing and blocking hydraulic communication between said second and fourth hydraulic chambers and a hydraulic reservoir; and means for sensing locking of said rear wheels to properly control said first and second valves such that pressure in said second and fourth hydraulic chambers is reduced when at least one of said rear wheels is being locked.

* * * * *